United States Patent
Wright (10) Patent No.: US 9,052,749 B2
(45) Date of Patent: Jun. 9, 2015

(54) APPARATUS AND METHOD FOR PROJECTOR NAVIGATION IN A HANDHELD PROJECTOR

(75) Inventor: Aaron C. Wright, Highland Village, TX (US)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 524 days.

(21) Appl. No.: 13/229,424

(22) Filed: Sep. 9, 2011

(65) Prior Publication Data

US 2013/0063337 A1    Mar. 14, 2013

(51) Int. Cl.
*G06F 3/01*      (2006.01)
*G06F 3/03*      (2006.01)
*G06F 3/0346*    (2013.01)

(52) U.S. Cl.
CPC .......... *G06F 3/0304* (2013.01); *G06F 3/0346* (2013.01)

(58) Field of Classification Search
CPC ........................................ G09G 5/00
USPC ........................................ 345/156
See application file for complete search history.

(56) References Cited

U.S. PATENT DOCUMENTS

| | | | |
|---|---|---|---|
| 8,454,173 B2* | 6/2013 | Nakamura et al. | 353/94 |
| 8,554,273 B2* | 10/2013 | Osaka et al. | 455/556.1 |
| 2010/0067181 A1* | 3/2010 | Bair et al. | 361/679.3 |
| 2011/0026972 A1* | 2/2011 | Kawamura | 399/223 |
| 2011/0292218 A1* | 12/2011 | Ichieda | 348/177 |

OTHER PUBLICATIONS

Avamar96, "Handheld Projector Demo", YouTube video available at: http://www.youtube.com/watch?v=8-AJnLMzE0k&feature=related, Apr. 25, 2007.

* cited by examiner

*Primary Examiner* — Fred Tzeng (57) ABSTRACT

A method and apparatus for navigating a projected image. The method includes projecting, by a projector, an image on a surface, the projected image comprising a first portion of a virtual image. The method also includes determining a movement of the projector, and in response to the movement of the projector, changing the projected image by projecting a second portion of the virtual image different from the first portion.

24 Claims, 5 Drawing Sheets

APPARATUS AND METHOD FOR PROJECTOR NAVIGATION IN A HANDHELD PROJECTOR

TECHNICAL FIELD OF THE INVENTION

The present application relates generally to handheld projectors and, more specifically, to an apparatus and method for projector navigation based on movement of a handheld projector.

BACKGROUND OF THE INVENTION

A portable or handheld projector may be used to project illuminated images, such as photos, videos, or presentations, onto a display surface, such as a wall or display screen. A portable projector offers many of the same functions as larger tabletop projectors, and its reduced size makes it extremely transportable. Portable projectors that are small enough to fit in the palm of a hand are sometimes called pico projectors. In some cases, a portable projector is embodied in a wireless communication device, such as a smart phone.

SUMMARY OF THE INVENTION

A method of navigating a projected image is provided. The method includes projecting, by a projector, an image on a surface, the projected image comprising a first portion of a virtual image. The method also includes determining a movement of the projector, and in response to the movement of the projector, changing the projected image by projecting a second portion of the virtual image different from the first portion.

A device for navigating a projected image is provided. The device includes a projector configured to project an image on a surface, the projected image having a first portion of a virtual image. The device also includes one or more sensors configured to detect a movement of the device. The device further includes a processor configured, in response to the movement of the device, to control the projector to change the projected image by projecting a second portion of the virtual image different from the first portion.

A computer program product for navigating a projected image at a handheld projector is provided. The computer program product includes a tangible machine-readable medium encoded with computer-executable instructions that when executed cause the handheld projector to perform projecting an image on a surface, the projected image comprising a first portion of a virtual image. The handheld projector also performs determining a movement of the handheld projector. The handheld projector further performs, in response to the movement of the handheld projector, changing the projected image by projecting a second portion of the virtual image different from the first portion.

In some embodiments, the virtual image can be zoomed in and out to reveal more or less of the virtual image, by either movement of the projector, or by one of either software or hardware controls.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged handheld projector.

The present disclosure provides a system and method for navigating in images projected from a handheld projector, such as a projector incorporated into a wireless communication device. A typical handheld projector simply displays an image or sequence of images on a surface towards which the projector is oriented. Any interaction associated with the projected image, such as clicking on a hyperlink when the projected image is an image of a website, is typically accomplished via controls on the projector device itself or through other input devices, such as a remote control or keyboard and mouse.

If a typical handheld projector is physically moved, the projected image simply moves accordingly, resulting in no direct effect on user interface or navigation techniques. Thus, in order for a user to see and access all of the navigable menus or interface elements contained within a projected image, the entire image must be projected. For example, if a user wants to interact with a fairly complex interface, such as CNN's homepage, the user would have to project the image of the entire homepage in order to be able to view each navigable option. Due to optical constraints of many projectors, the projected image would need to be quite large in order to see the details and navigable parts of the homepage. This results in a very large projected image, requiring the user to have a fairly large surface to project on.

Alternatively, a user could project only a portion of the complex interface (e.g., only a portion of CNN's homepage).

However, this would restrict the user's view of the interface, and limit the user to interact with only certain navigable options.

In accordance with this disclosure, a user could virtually lock down the projected image's position, and by physically moving the projector, reveal more information off-screen of the original image. By locking down the position, software may determine the movement and orientation of the projector and correspondingly offset the image, and make it appear as if the image were fixated on the surface. This gives the user the ability to reveal more of the image that is off-screen, by simply moving the projector. The user can return to the original view by simply moving the projector back in its original position.

Figure 1:
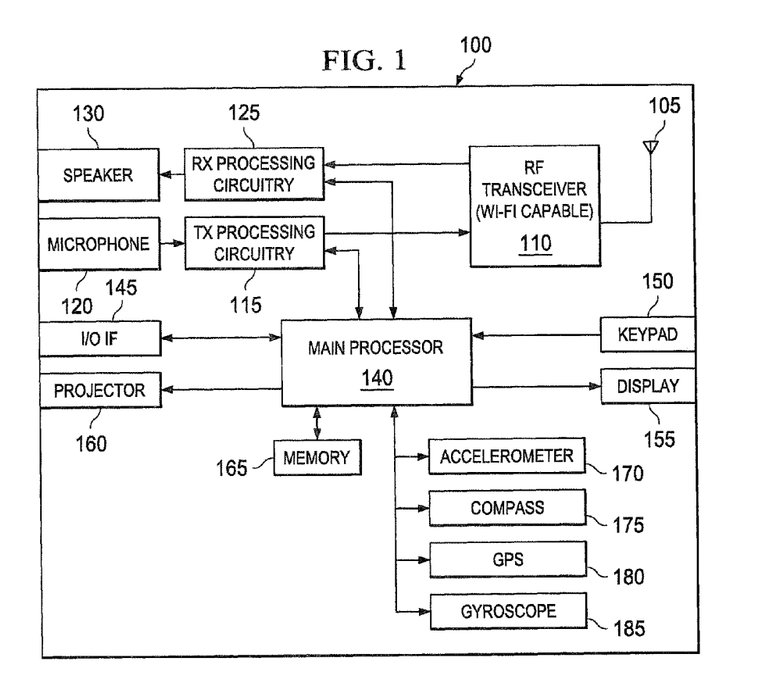
FIG. 1 illustrates a wireless device that includes a projector, according to one embodiment of the present disclosure.

FIG. 1 illustrates a wireless device that includes a projector, according to one embodiment of the present disclosure. Wireless device 100 comprises antenna 105, radio frequency (RF) transceiver 110, transmit (TX) processing circuitry 115, microphone 120, and receive (RX) processing circuitry 125. Wireless device 100 also comprises speaker 130, main processor 140, input/output (I/O) interface (IF) 145, keypad 150, display 155, projector 160, and memory 165. Wireless device 100 further comprises one or more navigational sensors, such as accelerometer sensor 170, compass 175, global positioning system (GPS) receiver 180, and gyroscopic sensor 185.

Radio frequency (RF) transceiver 110 receives from antenna 105 an incoming RF signal transmitted by a base station of a wireless network. Radio frequency (RF) transceiver 110 down-converts the incoming RF signal to produce an intermediate frequency (IF) or a baseband signal. The IF or baseband signal is sent to receiver (RX) processing circuitry 125, which produces a processed baseband signal by filtering, digitizing the baseband or IF signal, additional filtering, if necessary, demodulation and/or decoding. Receiver (RX) processing circuitry 125 transmits the processed baseband signal to speaker 130 (i.e., voice data) or to main processor 140 for further processing (e.g., web browsing).

Transmitter (TX) processing circuitry 115 receives analog or digital voice data from microphone 120 or other outgoing baseband data (e.g., web data, e-mail, interactive video game data) from main processor 140. Transmitter (TX) processing circuitry 115 encodes, modulates, multiplexes, and/or digitizes the outgoing baseband data to produce a processed baseband or IF signal. Radio frequency (RF) transceiver 110 receives the outgoing processed baseband or IF signal from transmitter (TX) processing circuitry 115. Radio frequency (RF) transceiver 110 up-converts the baseband or IF signal to a radio frequency (RF) signal that is transmitted via antenna 105. In accordance with embodiments of the present disclosure, RF transceiver 110, processing circuitry 115 and 125, and/or main processor 140 comprise a Wi-Fi module configured for Wi-Fi communication.

In certain embodiments, main processor 140 is a microprocessor or microcontroller. Memory 165 is coupled to main processor 140. In certain embodiments, part of memory 165 comprises a random access memory (RAM) and another part of memory 165 comprises a non-volatile memory, such as Flash memory, which acts as a read-only memory (ROM).

Main processor 140 controls the overall operation of wireless device 100. In one such operation, main processor 140 controls the reception of forward channel signals and the transmission of reverse channel signals by radio frequency (RF) transceiver 110, receiver (RX) processing circuitry 125, and transmitter (TX) processing circuitry 115, in accordance with well-known principles. Main processor 140 executes software stored in memory 165 in order to control the overall operation of wireless device 100.

Main processor 140 is capable of executing other processes and programs resident in memory 165. Main processor 140 can move data into or out of memory 165, as required by an executing process. Main processor 140 is also coupled to I/O interface 145. I/O interface 145 provides wireless device 100 with the ability to connect to other devices such as laptop computers and handheld computers. I/O interface 145 is the communication path between these accessories and main controller 140.

Main processor 140 is also coupled to keypad 150 and display unit 155. The operator of wireless device 100 uses keypad 150 to enter data into wireless device 100. Display 155 may be a liquid crystal display capable of rendering text and/or graphics from web sites. In certain embodiments, display 155 may be a touch-sensitive screen and keypad 150 may be displayed on the touch-sensitive screen of display 155. Alternate embodiments may use other types of displays.

In accordance with embodiments of the present disclosure, main processor 140 is coupled to projector 160 and one or more navigational sensors, such as accelerometer sensor 170, compass 175, global positioning system (GPS) receiver 180, and gyroscopic sensor 185. Projector 160 is capable of projecting an illuminated image onto a display surface. Compass 175 may be, for example, a 3D magnetic compass. Accelerometer 170, compass 175, GPS receiver 180, and gyroscopic sensor 185 enable wireless device 100 to determine location and orientation information, as described in greater detail herein. In certain embodiments, wireless device 100 may include one, more than one, or all of the navigational sensors. Signals received from the navigational sensors are used to control projector 160 and the display of images from projector 160.

Although FIG. 1 illustrates one example of wireless device 100, various changes may be made to FIG. 1. For example, wireless device 100 may represent a dedicated handheld projector that is not capable of sending or receiving voice or data communication over a wireless network. Such a projector may not include every component shown in FIG. 1, such as processing circuitry 115, 125 and RF transceiver 110. Also, the configuration shown in FIG. 1 is for illustration only. Various components could be combined, subdivided, or omitted and additional components could be added according to particular needs. In addition, functions described as being performed by one component of wireless device 100 could be performed by any other suitable component(s) of wireless device 100.

When a handheld projector or a device with a projector displays an image on a surface, the useful image size is limited by the optical capabilities of the projector and the position and eyesight of the viewer. If the projected image is made relatively large (e.g., by moving the projector further from the display surface), the projected image may become fuzzy or too dim. If the projected image is made relatively small (e.g., by moving the projector closer to the display surface), the projected image may be too small to read from a distance. In some embodiments, a display size measuring approximately two feet on the diagonal provides a sharp, well-illuminated image that is readable by several viewers in a space such as a small conference room. However, this size is merely one example. Other projectors may be capable of projecting readable images having smaller or larger sizes.

The size of the projected image limits the amount of information that can be conveyed. As an example, suppose a user wants to display a map of Texas. The map is relatively detailed, showing large cities and many smaller cities and towns, with their names and perhaps other information. If the user projects the entire map of Texas, very little (if any) of the text of the map can be read on the projected image, due to the optical constraints of the projector to display so much text in a space the size of the projected image. To make the text readable, a user could zoom into a smaller area of the map (e.g., the Dallas-Fort Worth region), but areas of Texas outside the zoomed area (e.g., Austin, El Paso) are no longer part of the projected image.

This zoomed position ("virtual position") can be locked, using a control or software input on the projector. The control may be a soft key on the projector's screen or a hardware key on the projector.

As the projector moves, the projected image moves on the display surface. As the projected image moves, the project image also changes to reveal content of the whole image (e.g., the map of Texas) that is beyond the edges of the zoomed image (e.g., the Dallas-Fort Worth region). For example, as the projector tilts downward, the projected image moves downward and begins to reveal parts of Texas below Dallas-Fort Worth (e.g., Austin may come into view on the projected image).

Figure 2:
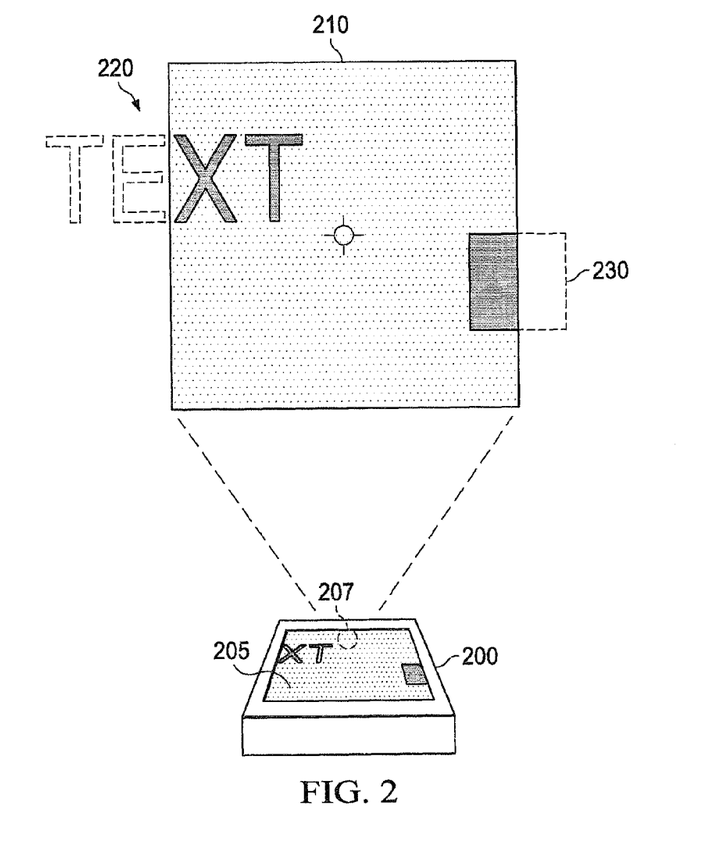
FIG. 2 illustrates an operation of a handheld projector according to an embodiment of this disclosure.

FIG. 2 illustrates an operation of a handheld projector according to an embodiment of this disclosure. For ease of explanation, handheld projector 200 may represent wireless device 100 of FIG. 1. However, other embodiments of handheld projector 200 may be used without departing from the scope of this disclosure.

As shown in FIG. 2, handheld projector 200 includes a display 205 and a projection unit 207. In an embodiment, display 205 may represent display 155, and projection unit 207 may represent projector 160. Display 205 displays an image, such as a website, a slide in a presentation, a report, or any other suitable text or graphic image. In an embodiment, display 205 may also display one or more controls, such as soft keys, configured to control one or more settings or operations of handheld projector 200.

Projection unit 207 of handheld projector 200 is activated and projects an image 210 onto a surface, such as a wall or display screen. Projected image 210 reveals a portion of a larger image that includes text 220 and graphic 230. The larger image may be a website, a slide in a presentation, a report, or any other suitable image containing text or graphics. The larger image is a virtual image, in that the portions of the larger image outside of projected image 210 are not currently displayed on the display surface.

For example, as shown in FIG. 2, projected image 210 includes the "XT" in "TEXT" in text 220 and the left half of the square in graphic 230. The "TE" in "TEXT" in text 220 and the right half of the square in graphic 230 are currently "hidden", i.e., not displayed on the display surface, and are represented with dotted lines in FIG. 2 only to illustrate the content of the larger image. As projector 200 is moved (e.g., rotated right or left), other portions of the larger image, including currently hidden portions of text 220 or graphic 230, may be revealed in the projected image 210. The movement of projector 200 is detected by one or more sensors in projector 200. Signals from the sensors related to the movement are processed in projector 200 and cause a change in the projected image from projection unit 207. This is described in greater detail below.

Display 205 may display a number of different images. In one embodiment, the image on display 205 is a replica or mirror of projected image 210. In other words, display 205 displays substantially the same image as is shown in projected image 210. As projected image 210 changes (e.g., due to movement of projector 200), the image in display 205 also changes.

In another embodiment, the image on display 205 is the larger image (i.e., the whole image including all of text 220 and graphic 230), of which projected image 210 shows only a portion and reveals other portions upon movement of projector 200. In this embodiment, although the projected image 210 may change to reveal previously hidden portions of the larger image (e.g., due to movement of projector 200), the image on display 205 remains the same.

In another embodiment, the image on display 205 is another image that is unrelated to projected image 210. For example, the image on display 205 may include one or more soft keys that control projection unit 207. As a particular example, if projected image 210 is a slide show of family photos on a wall, the image on display 205 may include thumbnails of the photos, or slide show controls, such as Next, Previous, Play Slideshow, Zoom in/out, Music, and so forth. As another example, if projected image 210 is a video (e.g., a movie), the image on display 205 may include video controls, such as Play, Fast Forward, Review/Rewind, Stop, and so forth.

Although FIG. 2 illustrates one example of handheld projector 200, various changes may be made to FIG. 2. For example, various components of handheld projector 200 could be combined, subdivided, or omitted and additional components could be added according to particular needs. In addition, functions described as being performed by one component of handheld projector 200 could be performed by any other suitable component(s) of handheld projector 200.

FIGS. 3 through 6 illustrate changes in a projected image due to movement of a projector, according to embodiments of this disclosure.

Figure 3:
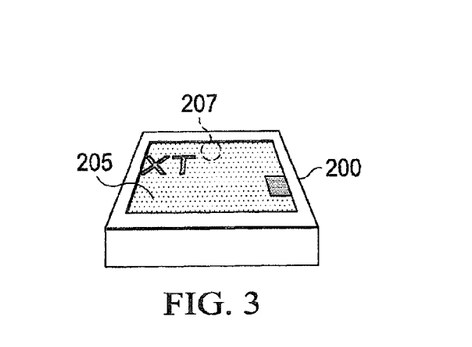
FIGS. 3 through 6 illustrate changes in a projected image due to movement of a projector, according to embodiments of this disclosure.

FIG. 3 illustrates handheld projector 200 with projection unit 207 deactivated. Display 205 displays an image, such as a website, a slide in a presentation, a report, or any other suitable text or graphic image. In an embodiment, display 205 may also display one or more controls, such as soft keys, configured to control one or more settings or operations of handheld projector 200.

Figure 4:
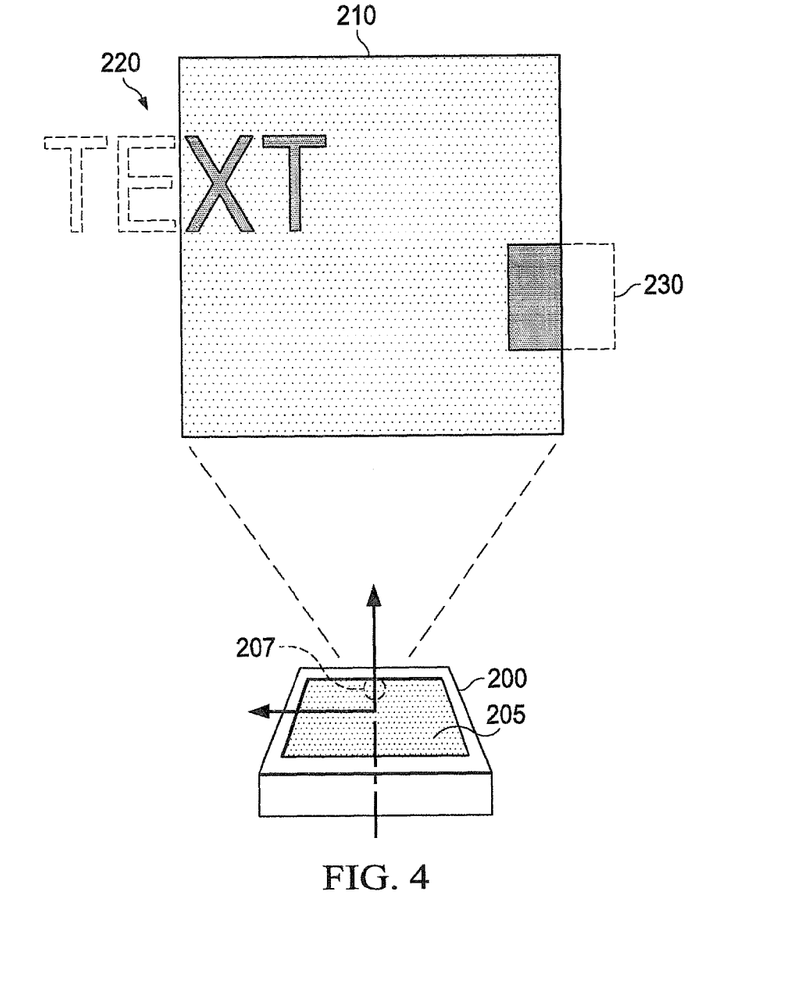

FIG. 4 illustrates handheld projector 200 with projection unit 207 activated, such as shown in FIG. 2. Projected image 210 displays a portion of a larger image that includes text 220 and graphic 230. Display 205 is not shown with an image in FIG. 4, however it will be understood that display 205 could display any suitable image, as described earlier.

Handheld projector 200 uses sensors to detect the position and movement of projector 200. The sensors may include one or more of the navigational sensors described in FIG. 1, such as accelerometer sensor 170, compass 175, global positioning system (GPS) receiver 180, and gyroscopic sensor 185.

In an embodiment, handheld projector 200 uses compass 175 and accelerometer sensor 170 to determine the location and orientation of projector 200. Using readings from accelerometer 170, along with a low pass filter associated with the accelerometer 170, projector 200 calculates the direction of gravity. Handheld projector 200 uses digital compass 175 in conjunction with accelerometer 170 to detect the direction that projector 200 is facing. As projector 200 moves, it uses compass 175 and accelerometer sensor 170 to detect changes in location, orientation, and direction of movement, as well as speed of movement. Handheld projector 200 may also use GPS receiver 180 or gyroscope 185 to detect changes in location, orientation, and direction of movement, as well as speed of movement.

Figure 5:
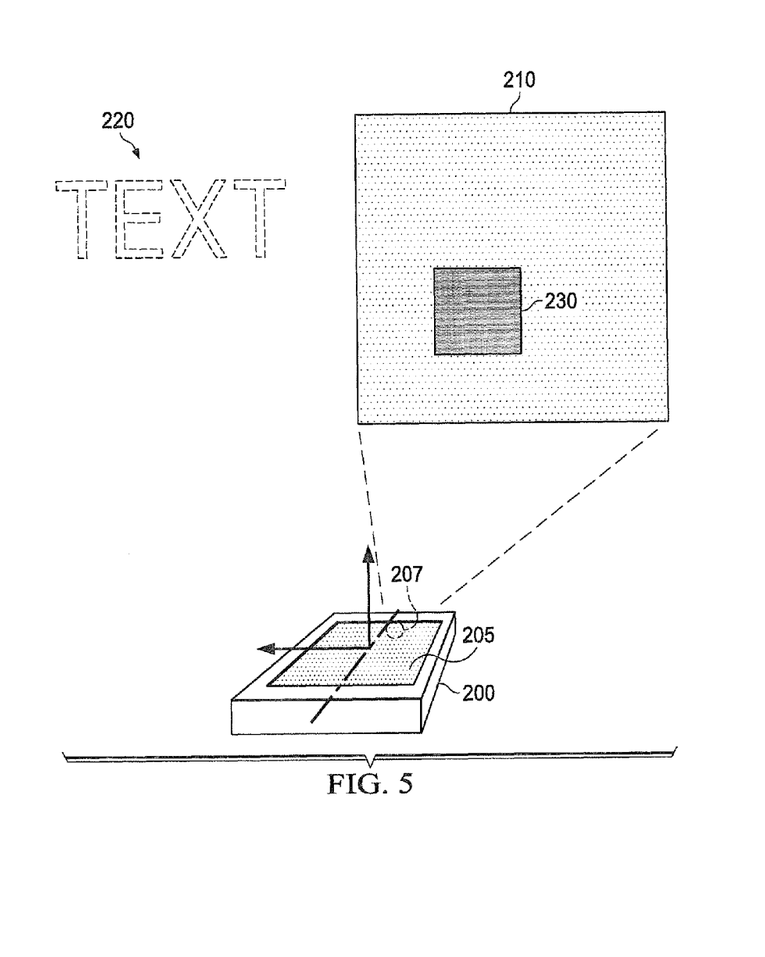

FIG. 5 illustrates handheld projector 200 after a rotational movement in one direction. As shown in FIG. 5, handheld projector 200 has been moved from its position shown in FIG. 4. Specifically, handheld projector 200 has been rotated several degrees to the right. As described above, one or more sensors in handheld projector 200 detect the movement. Signals from the one or more sensors indicating the magnitude, direction, speed, or timing of the movement are transmitted to a processor, such as main processor 140. The processor receives the signals and, based on the movement indicated by the signals, causes the projection unit 207 to display a different projected image 210. For example, projected image 210 shifts to the right on the display surface, due to the rotation of projector 200. In addition, the image displayed in projected image 210 also shifts to the right with respect to the larger virtual image. The change in display in projected image 210 is substantially synchronized with the movement of projector 200. In other words, as projector 200 moves, projected image 210 changes at the same time and at the same rate. More specifically, as projector 200 rotates to the right, hidden portions of graphic 230 are gradually revealed in projected image 210, while visible portions of text 220 are gradually concealed. As shown in FIG. 5, projected image 210 now includes all of graphic 230 and none of text 220.

Figure 6:
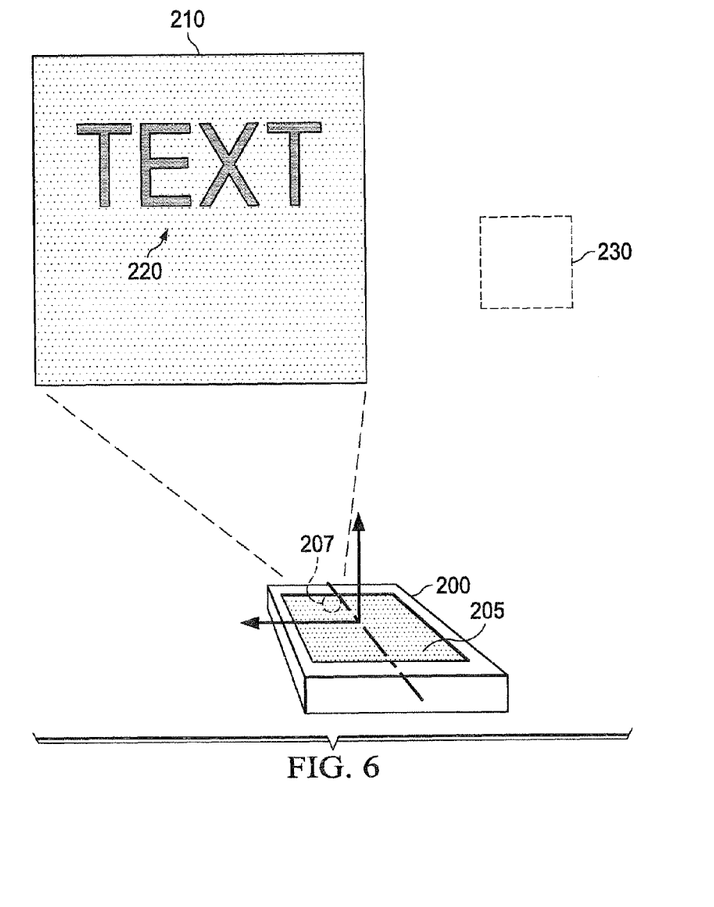

FIG. 6 illustrates handheld projector 200 after a rotational movement in another direction. As shown in FIG. 6, handheld projector 200 has been moved from its position shown in FIG. 5. Specifically, handheld projector 200 has been rotated several degrees to the left. Again, one or more sensors in handheld projector 200 detect the movement. Signals from the one or more sensors indicating the magnitude, direction, speed, or timing of the movement are transmitted to the processor, such as main processor 140. The processor receives the signals and, based on the movement indicated by the signals, causes the projection unit 207 to display a different projected image 210. Here, projected image 210 shifts back to the left on the display surface, due to the rotation of projector 200. In addition, the image displayed in projected image 210 also shifts to the left with respect to the larger virtual image. As shown in FIG. 6, projected image 210 now includes all of text 220 and none of graphic 230.

Although FIGS. 3-6 illustrate examples of changes in projected image 210 due to movement of projector 200, various changes may be made to FIGS. 3-6. For example, although projector 200 is described as being rotated left and right, projector 200 is capable of detecting other movements as well. As a specific example, projector 200 may detect rotational movement up or down (i.e., "pitch"), twisting rotational movement (i.e., "roll"), or translational movement in any direction. Projector 200 is capable of updating projected image 210 in response to any of these movements. As another example, the virtual image may be zoomed in and out to reveal more or less of the virtual image, by either movement of projector 200, or by one of either software or hardware controls.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of navigating a projected image, the method comprising:
   projecting, by a projector, an image on a surface, the projected image comprising a first portion of a virtual image;
   determining a movement of the projector; and
   in response to the movement of the projector, changing the projected image by projecting a second portion of the virtual image different from the first portion.

2. The method of claim 1, wherein determining the movement of the projector comprises detecting the movement at one or more sensors in the projector.

3. The method of claim 2, wherein the one or more sensors comprise at least one of an accelerometer, a compass, a GPS (global positioning system) receiver, and a gyroscopic sensor.

4. The method of claim 1, wherein the movement of the projector is at least one of a horizontal movement, a vertical movement, a tilt, and a rotation.

5. The method of claim 1, wherein the projected image changes as the projector moves, such that the image change and the projector movement are substantially synchronized.

6. The method of claim 1, further comprising:
   displaying a second image on a display of the projector, the second image being substantially the same as the virtual image.

7. The method of claim 1, further comprising:
   displaying a second image on a display of the projector, the second image being substantially the same as the projected image.

8. The method of claim 1, further comprising:
   displaying a second image on a display of the projector, the second image comprising at least one control for the projected image or the virtual image.

9. A device for navigating a projected image, the device comprising:
   a projector configured to project an image on a surface, the projected image comprising a first portion of a virtual image;
   one or more sensors configured to detect a movement of the device; and
   a processor configured, in response to the movement of the device, to control the projector to change the projected image by projecting a second portion of the virtual image different from the first portion.

10. The device of claim 9, wherein the one or more sensors comprise at least one of an accelerometer, a compass, a GPS (global positioning system) receiver, and a gyroscopic sensor.

11. The device of claim 9, wherein the movement of the device is at least one of a horizontal movement, a vertical movement, a tilt, and a rotation.

12. The device of claim 9, wherein the projected image changes as the device moves, such that the image change and the device movement are substantially synchronized.

13. The device of claim 9, further comprising a display configured to display a second image.

14. The device of claim 13, wherein the second image is substantially the same as the virtual image.

15. The device of claim 13, wherein the second image is substantially the same as the projected image.

16. The device of claim 13, wherein the second image comprises at least one control for the projected image or the virtual image.

17. A computer program product for navigating a projected image at a handheld projector, the computer program product comprising a non-transitory machine-readable medium encoded with computer-executable instructions that when executed cause the handheld projector to perform:
   projecting an image on a surface, the projected image comprising a first portion of a virtual image;
   determining a movement of the handheld projector; and
   in response to the movement of the handheld projector, changing the projected image by projecting a second portion of the virtual image different from the first portion.

18. The computer program product of claim 17, wherein determining the movement of the handheld projector comprises detecting the movement at one or more sensors in the handheld projector.

19. The computer program product of claim 18, wherein the one or more sensors comprise at least one of an accelerometer, a compass, a GPS (global positioning system) receiver, and a gyroscopic sensor.

20. The computer program product of claim 17, wherein the movement of the handheld projector is at least one of a horizontal movement, a vertical movement, a tilt, and a rotation.

21. The computer program product of claim 17, wherein the projected image changes as the handheld projector moves, such that the image change and the projector movement are substantially synchronized.

22. The computer program product of claim 17, the computer program product further causing the handheld projector to perform:

displaying a second image on a display of the handheld projector, the second image being substantially the same as the virtual image.

23. The computer program product of claim 17, the computer program product further causing the handheld projector to perform:

displaying a second image on a display of the projector, the second image being substantially the same as the projected image.

24. The computer program product of claim 17, the computer program product further causing the handheld projector to perform:

displaying a second image on a display of the projector, the second image comprising at least one control for the projected image or the virtual image.

* * * * *